United States Patent
Cheng et al.

(10) Patent No.: US 12,522,173 B2
(45) Date of Patent: Jan. 13, 2026

(54) RETROFIT SEATBELT MONITORING SYSTEM

(71) Applicant: Logistics and Supply Chain MultiTech R&D Centre Limited, Pok Ful Lam (HK)

(72) Inventors: Chun Hung Cheng, Pok Fu Lam (HK); Ho Lam, Pok Fu Lam (HK); Shiu Kee Luk, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 170 days.

(21) Appl. No.: 18/184,307

(22) Filed: Mar. 15, 2023

(65) Prior Publication Data
US 2024/0308465 A1    Sep. 19, 2024

(30) Foreign Application Priority Data

Mar. 13, 2023   (HK) ............................ 32023069932.6

(51) Int. Cl.
  *B60R 22/48*   (2006.01)
  *B60N 2/00*    (2006.01)

(52) U.S. Cl.
  CPC .............. *B60R 22/48* (2013.01); *B60N 2/002* (2013.01); *B60R 2022/4816* (2013.01); *B60R 2022/4866* (2013.01)

(58) Field of Classification Search
  CPC ............ B60R 22/48; B60R 2022/4816; B60R 2022/4866; B60N 2/002
  See application file for complete search history.

(56) References Cited

U.S. PATENT DOCUMENTS

| | | | | |
|---|---|---|---|---|
| 4,849,733 A | * | 7/1989 | Conigliaro | B60R 22/48 340/457.1 |
| 6,059,066 A | * | 5/2000 | Lary | B60R 22/48 340/457.1 |
| 2007/0096891 A1 | * | 5/2007 | Sheriff | B60N 2/267 297/464 |
| 2007/0285219 A1 | * | 12/2007 | Greene | B60R 22/48 340/457.1 |

(Continued)

FOREIGN PATENT DOCUMENTS

| CN | 103386949 A | 11/2013 |
|---|---|---|
| CN | 105539355 A | 5/2016 |

(Continued)

*Primary Examiner* — Ryan W Sherwin
(74) *Attorney, Agent, or Firm* — Renner, Kenner, Greive, Bobak, Taylor & Weber

(57) ABSTRACT

A retrofit system for the monitoring of seatbelt status in mass transit vehicles is adapted for retrofitting in different existing vehicles and includes a plurality of non-contact position sensors each associated with the buckle and tongue of a seatbelt, and a seat pan upholstery module with a seat occupancy sensor fixed to its inner side. The sensor of the non-contact position sensors is adapted to be fixed to an external surface of the buckle housing. A monitoring unit is coupled to the non-contact position sensors and occupancy sensors and to a display of seatbelt status comprising an indication that, when each of the seats is occupied, whether the respective seatbelt is in the fastened positioned or a released position.

10 Claims, 4 Drawing Sheets

(56) References Cited

U.S. PATENT DOCUMENTS

| | | | | |
|---|---|---|---|---|
| 2009/0008919 | A1* | 1/2009 | Mather | B60R 22/46 |
| | | | | 280/801.1 |
| 2018/0265215 | A1 | 9/2018 | Pollard | |
| 2018/0334134 | A1* | 11/2018 | Desoyza | B60R 22/48 |
| 2019/0381860 | A1* | 12/2019 | Credo | G08B 5/00 |
| 2021/0206343 | A1* | 7/2021 | Welk | B60K 35/80 |

FOREIGN PATENT DOCUMENTS

| | | |
|---|---|---|
| CN | 109071025 A | 12/2018 |
| CN | 208993645 U | 6/2019 |
| CN | 112550213 A | 3/2021 |
| KR | 20200002364 U * | 10/2020 |

* cited by examiner

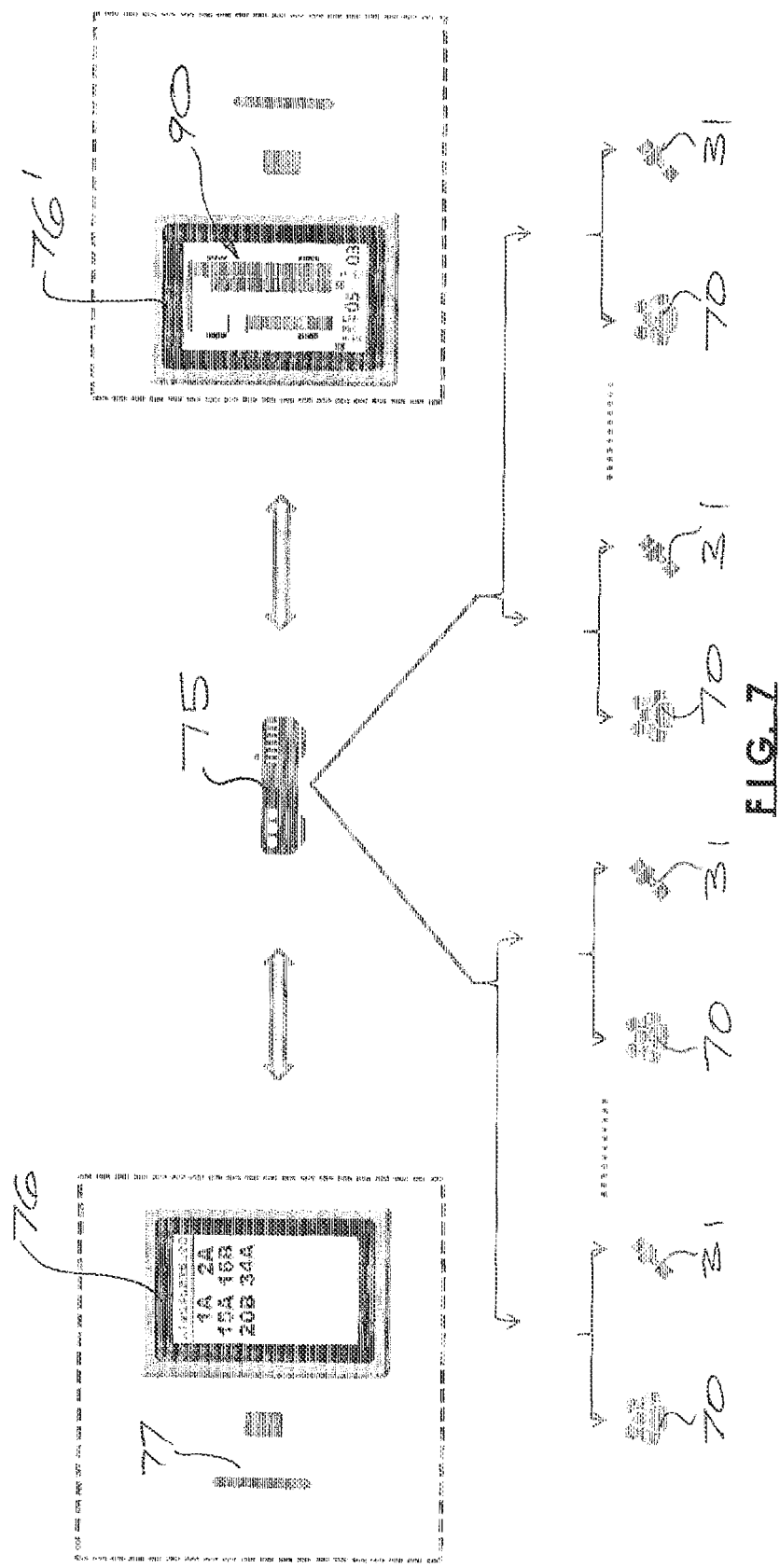

RETROFIT SEATBELT MONITORING SYSTEM

TECHNICAL FIELD

The present invention relates to the monitoring of seatbelt status in mass transit vehicles, and more particularly, to a retrofit seatbelt monitoring system.

BACKGROUND OF THE INVENTION

Buses often include seatbelts to secure passengers in their seats and, to increase seatbelt usage, a monitoring system may indicate, when each seat is occupied, whether or not the associated seatbelt is fastened. To extend the use of seatbelt monitoring systems beyond new vehicles, there is a need for a retrofit solution that is adapted for broad application in different models of vehicle produced by different manufacturers. It is an object of the present invention to address this need or, more generally, to provide an improved seatbelt monitoring system.

DISCLOSURE OF THE INVENTION

According to one aspect of the present invention there is provided a retrofit seatbelt monitoring system comprising:
  a vehicle having array of seats, each seat comprising a seat pan and a seat back, the seat pan having a cover, a respective seatbelt of each seat compromising a buckle and a tongue forming a pair, a buckle housing of the buckle enclosing a latching mechanism, the housing having a tongue-receiving recess for receiving the tongue in a fastened position, a release latch mounted to the housing to release the tongue from the buckle;
  a plurality of non-contact position sensors each associated with the buckle and tongue of one pair, each non-contact position sensor configured to sense and output a signal indicative of when the seatbelt is fastened and comprising a sensor unit fixed to an external surface of the buckle housing, and a sensed element fixed to the tongue;
  a seat pan upholstery module comprising an upholstery part for covering a seat pan over the cover, the upholstery part having an outer side that a passenger sits on in use and an opposing inner side and a seat occupancy sensor fixed to the inner side, the seat occupancy sensor configured to sense and output a signal indicative of when a passenger is occupying the associated seat;
  a display, and
  a monitoring unit coupled to the non-contact position sensors and occupancy sensors to receive the output signals therefrom and to indicate a seatbelt status, the seatbelt status comprising an indication that, when each of the seats is occupied, whether the respective seatbelt is in the fastened positioned or a released position; the monitoring unit coupled to the display to provide indicia on the display corresponding to the seatbelt status.

Preferably the retrofit seatbelt monitoring further comprises an alarm coupled to the monitoring unit for providing an audible warning relating to the seatbelt status.

Preferably the display displays to passengers an array of indicators in positions substantially corresponding to positions of seats in a plan view, each indicator visually indicating one of three states for each of the seats, a first state being that the seat is unoccupied, a second state being that the seat is occupied but the seatbelt is not in the fastened positioned, and the third state being that the seat is occupied and the seatbelt is fastened. Preferably the second and third states are indicated by the colours red and green, respectively.

Preferably the sensor unit comprises an enclosure with an outer face that is adhesive bonded to the external surface of the buckle housing to fix the sensor unit to the buckle housing. Alternatively, the sensor unit may be fixed to the buckle housing by other means, such as fasteners or welding.

Preferably the outer face is concave. Preferably the outer face comprises a ruled surface, most preferably ruled by parallel lines.

Preferably the tongue has a flat engagement strip received in the buckle and an imaginary plane parallel to the engagement strip bisects the tongue and, when the tongue is in the fastened position, bisects the buckle housing, the buckle housing having a major surface on each side of the imaginary plane, and the external surface comprises one of the major surfaces.

Preferably the tongue and buckle are connected by movement along an axis that lies in the imaginary plane, the tongue-receiving recess is formed in an axially-outer end of the buckle housing, a mounting fixture extends from an opposing axially-inner end of the buckle housing, and the sensor unit is offset axially inwardly of the axially outer end.

Preferably the release latch is disposed on a first side of the imaginary plane, and the external surface of the buckle housing is on a second side of the imaginary plane, opposite the first side.

Preferably the sensor unit comprises a reed switch and the sensed element comprises a permanent magnet. An alternative non-contact position sensor may be of the optical type, as where the sensed element comprises a reflector that reflects a beam to a photo-receiver, but of course many other types of sensor, such as inductive or capacitive sensors, may equally be used in this application, Preferably the permanent magnet is elongated, most preferably such that a polar axis of the permanent magnet extends substantially transversely relative to the axis.

Preferably the seat pan upholstery module further comprised fastenings for securing the upholstery part to the seat pan.

This invention thus provides a retrofit seatbelt monitoring system which is effective and efficient in operational use, and which by its modular construction, simplicity and versatility, allows existing vehicles to be readily retrofitted in a cost-effective manner that avoids waste.

BRIEF DESCRIPTION OF THE DRAWINGS

Preferred forms of the present invention will now be described by way of example with reference to the accompanying drawings, wherein:

FIG. 7 is a schematic diagram in accordance with the invention.

DESCRIPTION OF THE PREFERRED EMBODIMENTS

Figure 1:
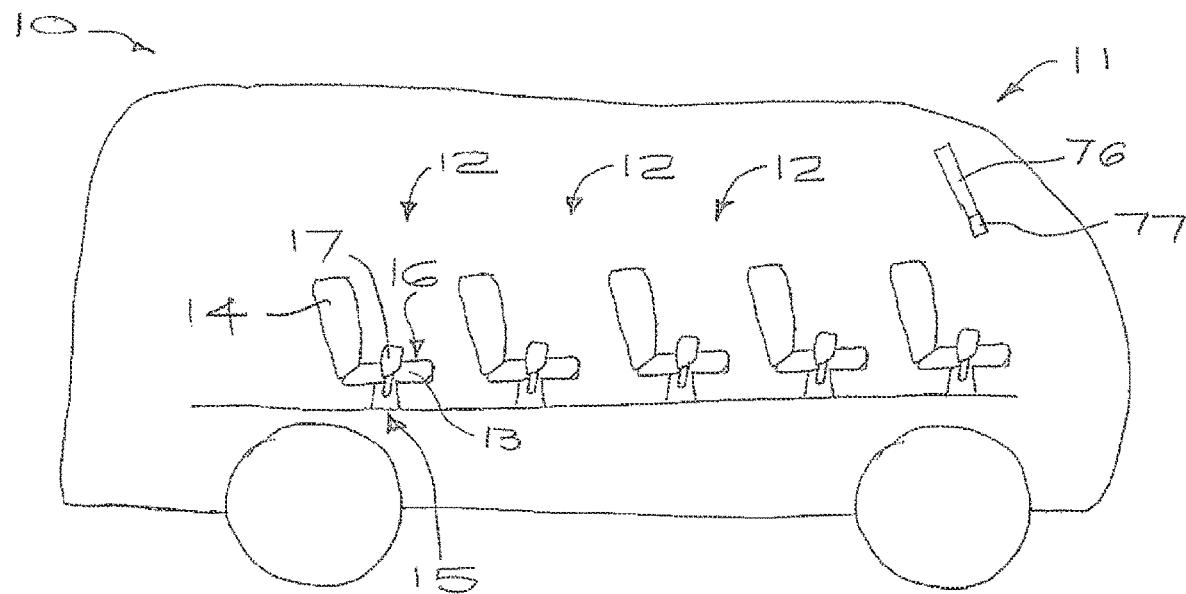
FIG. 1 is a schematic side view of an example bus of a preferred retrofit seatbelt monitoring system according to the invention.

Referring to FIG. 1, a retrofit seatbelt monitoring system 10 according to the invention includes a mass transit vehicle 11, such as a bus, in which seatbelts are used to secure passengers. The vehicle 11 has array of seats 12, each seat 12 comprising a seat pan 13 and a seat back 14. The seat pan 13 essentially supports the passenger's weight, and may comprise a base assembly 15 fixed to a structural member of the vehicle 11. The base assembly 15 may comprise a frame, springs and padding (not shown) upholstered for comfort with a cover 16 made from flexible material, such as fabric or leather, in the well-known manner.

A seatbelt comprises a buckle 17 and a tongue 18, as well as a belt (not shown) that slidably supports the tongue 18, anchors for the ends of the belt and the buckle 17 and, optionally, a retractor, (not shown) associated with each seat and secured to the structure of the seat, or of the vehicle. Seatbelt variants include, among others, a lap belt with two anchors and a three-point belt. In all cases, securing the seatbelt involves connecting at least one buckle and tongue pair, as by relative translation along an axis 19.

Figure 2:
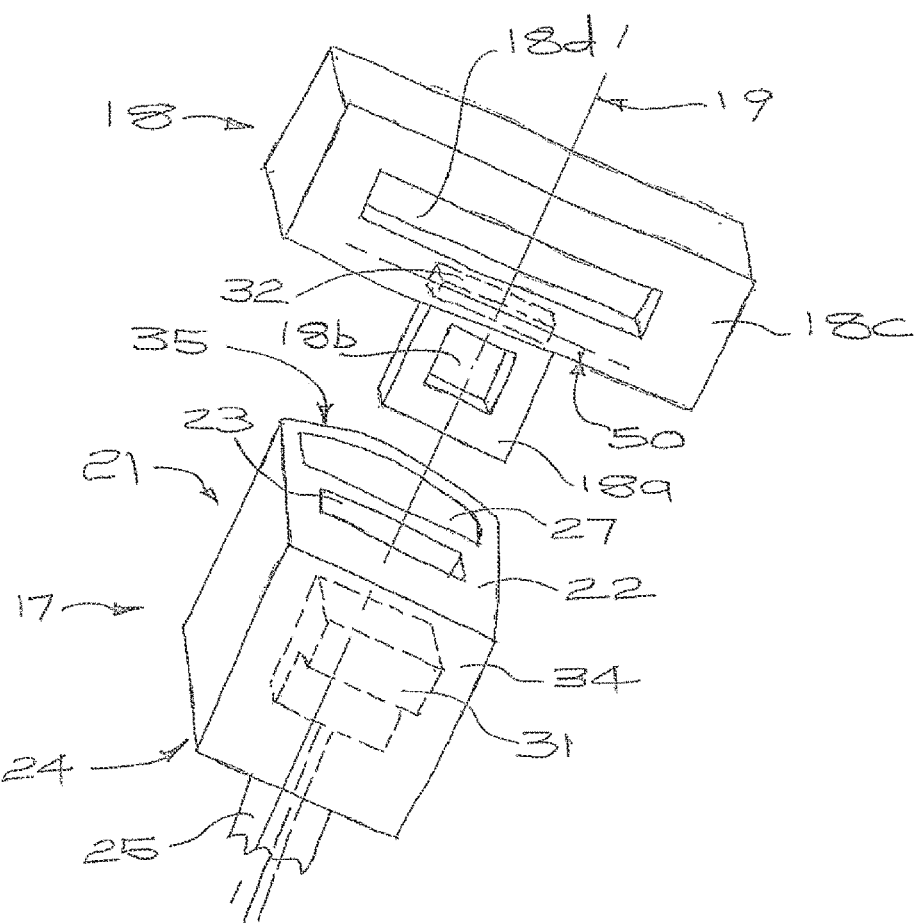
FIG. 2 is a perspective view of a tongue and buckle pair of a seatbelt according to the invention.

The tongue 18 used on the seatbelt, as shown in FIG. 2, includes an engagement strip 18a having an engagement aperture 18b which is engaged with the buckle 17 when a latch member (not shown) comes into engagement with the engagement aperture 18b when the tongue 18 is inserted into the buckle 17. The tongue 18 includes a grip portion 18c arranged to be gripped for inserting and engaging the tongue 18 into/with the buckle 6. The belt (not shown) extends through a through-extending slot 18d formed in the grip portion 18c, by which arrangement the tongue 5 is slidably supported by the belt. Typically, the tongue 18 is formed of a metallic plate, and the gripper portion 18c is formed of moulded resin in a flat and substantially rectangular prismatic form.

The buckle housing 21 enclosing the latching mechanism 41 may also be largely of rectangular prismatic form with an axially outer end 22 and an opposing axially inner end 24 from which a mounting fixture extends 25. A tongue-receiving recess 23 is formed in the axially outer end 22, and may include a converging mouth (not shown) that tapers to narrow toward the axially inner end 24 to help with insertion. The buckle 17 also includes a release latch 27 mounted to the housing 21 to release the tongue 18 from the buckle 17.

A magnetically-responsive switch, or reed switch 30, provides a non-contact position sensor able to indicate when each seatbelt is in the fastened position. The reed switch 30 comprises a sensor unit 31 fixed to the buckle 17 and a sensed element in the form of a permanent magnet 32 fixed to the tongue 18. To allow for ready installation, and avoiding waste by the re-use of existing components, an enclosure 32 of the sensor unit 31 is preferably adhesive bonded to an external surface of the buckle housing 21 to fix the sensor unit 31 to the buckle housing 21.

Figures 3, 4:
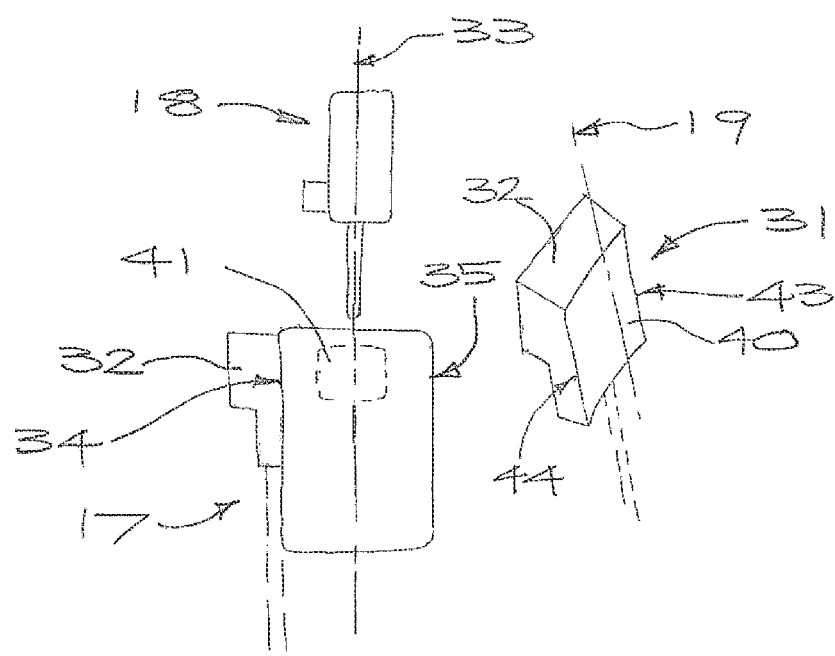
FIG. 3 is side elevation of the tongue and buckle pair of FIG. 2.
FIG. 4 is a perspective view of the sensor unit of FIG. 2.

Referring to FIGS. 2 to 4, the engagement strip 18a is flat and an imaginary plane 33 parallel to the engagement strip 18a bisects the tongue 18 and, when the tongue 18 is in the fastened position, bisects the buckle housing 21. The axis 19 lies in this imaginary plane 33. The buckle housing 21 has a first major surface 34 on one side of the imaginary plane 33 and a second major surface 35 on the other side, both of which extend between the axially outer end 22 and opposing axially inner end 24. The major external surface 34, on the side of the imaginary plane 33 opposite to that of the release latch 27, provides the attachment site. This avoids interference with the release latch 27 and, although facing toward the passenger, due to its small size, satisfactory comfort is maintained.

In preparation for attaching the sensor unit 31, the buckle 17 may be removed from the vehicle 10, and the major external surface 34 prepared for adhesive bonding, as by cleaning and roughening. The outer face 40 of the enclosure 32 to which the external surface 34 is bonded may be prepared in the same manner. The sensor unit 31 is offset axially inwardly of the axially outer end 22 by a small amount, and generally centrally in the transverse direction. While the major external surface 34 on many makes of buckle 17 is substantially planar, on some there may be a small degree of convexity, and to readily accommodate both, the outer face 40 of the enclosure 32 may be slightly concave, comprising a ruled surface ruled by lines parallel to the axis 19. In this configuration, the edges 43, 44 extending axially provide line-contact when pressed against a major external surface 34, ensuring reliable orientation when clamping in place while the adhesive cures. An adhesive, compatible with the (plastics) material of the buckle housing 21 and the enclosure 32 provides a strong, permanent fastening.

Using the retrofit system 10, the tongues 18 are also re-used after modification by fixing the magnet 32. The magnet 32 may be a generally rectangular prismatic member with a polar axis 50 that extends substantially transversely relative to the axis 19. The magnet 32 may be fixed to the grip portion 18c, being disposed axially inwardly of the slot 18d and generally centrally in the transverse direction, so as to be positioned adjacent to, and spaced from, the sensor unit 31 in the fastened position. A planar face of the magnet 32 is thus permanently adhesive bonded to the grip portion 18c.

Figure 5:
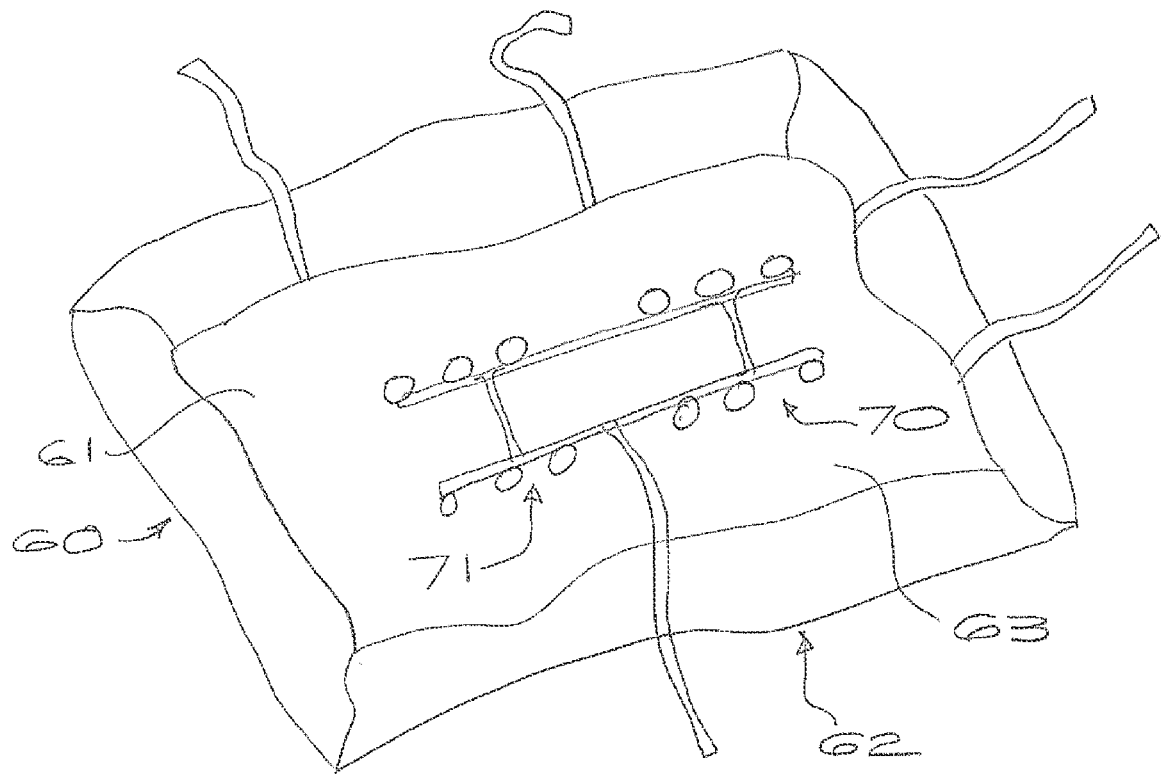
FIG. 5 shows a seat pan upholstery module of the invention before installation on a seat, and partially inverted to expose the associated seat occupancy sensor
Figure 6:
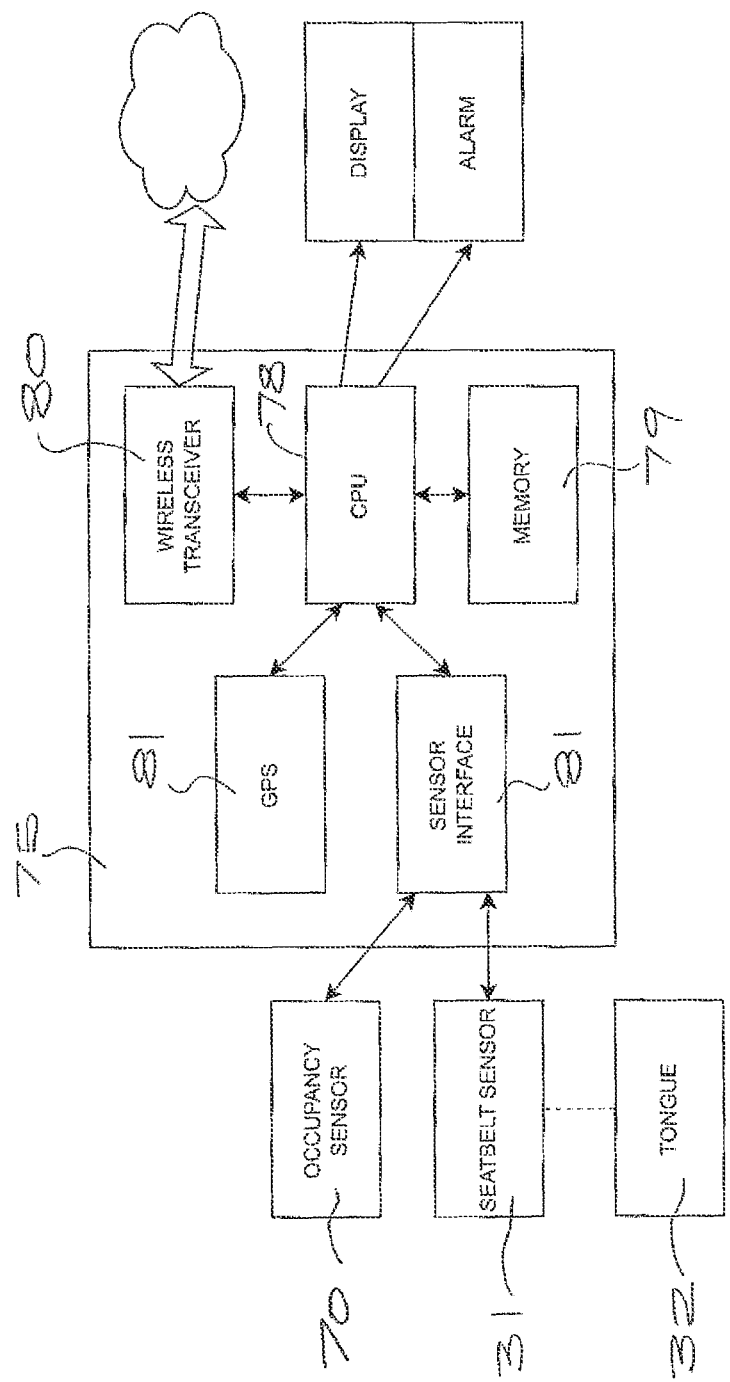
FIG. 6 is a block diagram of the monitoring unit and associated connections of the system of FIG. 1.

FIG. 5, shows a seat pan upholstery module 60 comprising an upholstery part 61 for covering the seat pan 13 over the cover 16, the upholstery part 61 having an outer side 62 that a passenger sits on in use and an opposing inner side 63, fastenings 64 for securing the upholstery part 61 to the seat pan 13 and a seat occupancy sensor 70 fixed to the inner side 63, the seat occupancy sensor 70 configured to sense and output a signal indicative of when a passenger occupying the associated seat 12. The seat occupancy sensor 70 may be a flexible assembly comprising comprise an array of mechanical switches 71, all resiliently biased to respective open positions, such that a closed circuit conditions indicates a passenger is sitting in the seat, as his weight has closed at least one of the switches 71. The seat pan upholstery module 60 includes fastenings for securing the upholstery part to the seat pan 13.

A monitoring unit 75 is connected to each of the occupancy sensors 70, and the sensor units 31 to receive the output signals therefrom and to indicate a seatbelt status. The monitoring unit 75 indicates, when each of the seats 12 is occupied, whether the respective seatbelt is in the fastened positioned or a released position. The monitoring unit 75 is also coupled to a display 76 and to an alarm 77. The monitoring unit 75 may comprise a CPU 78, associated memory 79, and a sensor interface 81 for interfacing with the occupancy sensors 70, and the sensor units 31. A wireless transceiver 80 provides the ability to provide, for instance, usage and telemetry data from the GPS 81 saved in memory 79 to a remote device 81.

The display 76 may be mounted overhead, together with the audio alarm 77, and in larger vehicles, multiple displays and alarms 77 may be provided.

FIG. 7 shows in more detail two different ways, indicated by the numbers 76, 76', in which the monitoring unit 75 may operate the display, together with the alarm 77, to indicate seat status. The display 76 lists seat numbers, and this is accompanied by audio from the alarm 77, inviting the passengers in the listed seats to fasten their seatbelts.

The display 76' displays to passengers an array of indicators 90 in positions substantially corresponding to positions of seats 12 in a plan view i.e. with an aisle with seats 12 to either side. Each indicator 90 visually indicates one of three states for each of the seats 12, a first state being that the seat is unoccupied, a second state being that the seat is occupied but the seatbelt is not in the fastened positioned (indicated in red), and the third state being that the seat is occupied and the seatbelt is fastened (indicated in green).

It will be appreciated that, in addition to encouraging seatbelt use, the system 10 may provide vehicle operators with telemetry data on patronage that is otherwise more difficult to obtain. For instance, combined with the GPS data, a measure of passenger-kilometres can be obtained.

Aspects of the present invention have been described by way of example only and it should be appreciated that modifications and additions may be made thereto without departing from the scope thereof.

The invention claimed is:

1. A retrofit seatbelt monitoring system comprising:
a vehicle having array of seats, each seat comprising a seat pan and a seat back, the seat pan having a cover, a respective seatbelt of each seat compromising a buckle and a tongue forming a pair, a buckle housing of the buckle enclosing a latching mechanism, the housing having a tongue-receiving recess for receiving the tongue in a fastened position, a release latch mounted to the housing to release the tongue from the buckle;
a plurality of non-contact position sensors each associated with the buckle and tongue of one pair, each non-contact position sensor configured to sense and output a signal indicative of when the seatbelt is fastened and comprising a sensor unit fixed to an external surface of the buckle housing, and a sensed element fixed to the tongue, wherein the sensor unit comprises an enclosure with an outer face that is adhesive bonded to the external surface of the buckle housing to fix the sensor unit to the buckle housing, and wherein the outer face is concave and comprises a ruled surface ruled by parallel lines;
a seat pan upholstery module comprising an upholstery part for covering a seat pan over the cover, the upholstery part having an outer side that a passenger sits on in use and an opposing inner side and a seat occupancy sensor fixed to the inner side, the seat occupancy sensor configured to sense and output a signal indicative of when a passenger is occupying the associated seat;
a display, and
a monitoring unit coupled to the non-contact position sensors and occupancy sensors to receive the output signals therefrom and to indicate a seatbelt status, the seatbelt status comprising an indication that, when each of the seats is occupied, whether the respective seatbelt is in the fastened positioned or a released position; the monitoring unit coupled to the display to provide indicia on the display corresponding to the seatbelt status.

2. The retrofit seatbelt monitoring system of claim 1 further comprising an alarm coupled to the monitoring unit for providing an audible warning relating to the seatbelt status.

3. The retrofit seatbelt monitoring system of claim 1 wherein the display displays to passengers an array of indicators in positions substantially corresponding to positions of seats in a plan view, each indicator visually indicating one of three states for each of the seats, a first state being that the seat is unoccupied, a second state being that the seat is occupied but the seatbelt is not in the fastened positioned, and the third state being that the seat is occupied and the seatbelt is fastened.

4. The retrofit seatbelt monitoring system of claim 3 wherein the second and third states are indicated by the colours red and green, respectively.

5. The retrofit seatbelt monitoring system of claim 1 wherein the seat pan upholstery module further comprises fastenings for securing the upholstery part to the seat pan.

6. The retrofit seatbelt monitoring system of claim 1 wherein the tongue has a flat engagement strip received in the buckle and an imaginary plane parallel to the engagement strip bisects the tongue and, when the tongue is in the fastened position, bisects the buckle housing, the buckle housing having a major surface on each side of the imaginary plane, and the external surface comprises one of the major surfaces.

7. The retrofit seatbelt monitoring system of claim 6 wherein the release latch is disposed on a first side of the imaginary plane, and the external surface of the buckle housing is on a second side of the imaginary plane, opposite the first side.

8. The retrofit seatbelt monitoring system of claim 6 wherein the tongue and buckle are connected by movement along an axis that lies in the imaginary plane, the tongue-receiving recess is formed in an axially-outer end of the buckle housing, a mounting fixture extends from an opposing axially-inner end of the buckle housing, and the sensor unit is offset axially inwardly of the axially outer end.

9. The retrofit seatbelt monitoring system of claim 1 wherein the sensor unit comprises a reed switch and the sensed element comprises a permanent magnet.

10. The retrofit seatbelt monitoring system of claim 9 wherein the permanent magnet is elongated such that a polar axis of the permanent magnet extends substantially transversely relative to the axis.

* * * * *